Patented Nov. 4, 1941

2,261,748

UNITED STATES PATENT OFFICE 2,261,748

CHLORINATED HYDROCARBON RESIN

Richard Waller, Helsingfors, and Charley Gustafsson, Imatra, Finland, assignors to Johan Bjorksten, Chicago, Ill.

No Drawing. Application November 7, 1940, Serial No. 364,752

11 Claims. (Cl. 260—2)

This invention relates to compositions of matter and to methods of preparing such compositions, and more particularly to varnishes, lacquers and resins prepared from inexpensive hydrocarbon products.

This application is a continuation in part of our copending application, Serial No. 213,185, filed June 11, 1938.

Heretofore, resins have been prepared from hydrocarbons by various processes. However, the prior methods which have employed as raw materials inexpensive products containing mixtures of a great number of different hydrocarbons, have produced as by-products heavy resinous oils, or very low melting point solid materials, which, unless removed, have imparted undesirable properties in the resulting products; for example, excessive softness, tackiness, and the like. The removal of these undesirable by-products has been attained only by inconvenient and costly steps in the processes of manufacture, such as, for example, separation of these by-products from the resins by steps involving extraction, distillation, or the like.

One of the objects of this invention is to provide a method of preparing a varnish-like drying solution of hydrocarbon resins from inexpensive, heterogeneous hydrocarbon materials, which solutions when exposed to the atmosphere or air dry to form hard tenacious films of good adhesion to glass, metals, and the like surfaces. The process of manufacture of the solutions does not involve the step of separating or removing any heavy oil, or soft resin fraction from the reaction product.

Another object of this invention is to provide a method of preparing, from inexpensive hydrocarbon materials, varnishes or impregnation compositions which have exceptional repellent properties for forms of organic life which attack fibrous organic materials.

Another object of our invention is to prepare, by a simplified method, drying solutions of hydrocarbons.

A further object of our invention is to prepare new and useful synthetic resins from inexpensive hydrocarbons.

Further objects and advantages of this invention will become apparent from the following detailed disclosure.

In accordance with our invention, a heterogeneous pyrolytically treated hydrocarbon mixture or fraction thereof, distillable below 300° C. at atmospheric pressure, is chlorinated substantially to the point of saturation, and contacted with a polymerization catalyst of the Friedel-Craft type, preferably aluminum chloride, without the addition of non-chlorinated or partially chlorinated hydrocarbon mixtures comprising essentially a substantial amount of at least one member of the class consisting of unsaturated cyclic hydrocarbons and of naphthenes prior to the polymerization step.

On completion of the polymerization reaction the catalyst is preferably removed, for example with water, or, if a volatile catalyst such as for example hydrogen fluoride has been employed, by distillation. To facilitate the washing operation, the viscosity of the product may be reduced by adding a diluent or thinning solvent, such as a fraction of cracked petroleum. In general, the product is readily miscible with all low-boiling petroleum solvents containing substantial amounts of unsaturated and/or aromatic hydrocarbons or derivatives.

The product thus obtained by the preferred process is a drying solution of solid hydrocarbon resinous material, or a varnish-like material, which upon application to glass, metals, wood, and the like, and upon exposure to the atmosphere yields a hard, tenacious film of good adhesion. When admixed with a small amount of a drying oil, such as linseed oil, the resulting composition forms a good baking lacquer. It is adapted to admixture with pigments or other paint ingredients to produce paint compositions of excellent resistance to molds and like organisms. By modifying the process, or by selecting as raw materials liquid phase cracked petroleums, or other petroleum products which have been subjected to a less drastic pyrolytic treatment than the preferred type of raw material, it is possible to prepare solutions of permanently soft or tacky products, or even non-drying oils which may, however, be desirable for certain specific applications; for example, some of the wood impregnating and protecting agents disclosed and claimed in the co-pending application of Charley Gustafsson, Serial No. 197,201, filed March 21, 1938.

In the resinification reactions of the prior art, low melting difficultly volatile substances are formed as by-products. These non-volatile, oily or soft by-products render the reaction products non-drying or tacky, which for the most applications is highly undesirable. Therefore, in the production of varnish-like materials it has heretofore been necessary to separate the resinous materials from the low-melting, non-volatile by-products. This has been effected by distilling off the low-boiling fractions and subsequently removing by vacuum distillation the low-melting, non-drying and/or the resinous materials substantially non-volatile at atmospheric pressure. These undesirable by-products may be removed by other processes, such as prolonged steam distillation, steam distillation at reduced pressure, extraction procedures, or the like. To prepare a varnish-like material, the remaining purified resinous constituents have then been dissolved in suitable solvents.

In accordance with our invention, the formation of non-drying and/or non-volatile low-melting by-products is substantially avoided. We have discovered that it is possible to prepare, from inexpensive raw-materials, in high yields, a drying resin solution or a varnish-like material, suitable for coating purposes or paint manufacture, without the necessity of separating or removing any part of the reaction product. Obviously, this is a great simplification of the process, and results in great savings in production cost.

More specific differences and distinctions from the processes found in the prior art are as follows:

The patents to C. A. Thomas and his co-workers, Nos. 1,836,629, 1,947,626, 1,982,708, and 2,062,845, and to C. A. Hochwalt No. 2,035,233, do not contemplate the use of chlorine as an aid in securing the desired degree of polymerization. The yields of solid resin according to the present invention are on the average 400% higher than those obtained by the processes disclosed by Thomas and his co-workers and Hochwalt, when applied to identical raw materials. The products obtained by our method have a hardness, softening point and adhesion qualities approximately equal to those of products obtained by the processes disclosed in the above mentioned patents. Although these physical properties are similar, the chemical properties differ greatly. The resins of the present invention contain appreciable amounts of chlorine, generally 3% to 15%, while the resins obtained by the processes disclosed in the above mentioned patents are free from chlorine.

The patents to Fulton and Kunc, No. 2,038,558, and to Frolich, No. 2,052,172, employ as raw materials, oils obtained by distillation of petroleum tars at 1 mm. pressure and temperatures of approximately 150° C., which corresponds to a boiling range beginning above 400° C. at atmospheric pressure, or more than one hundred Centigrade degrees above the boiling range of the raw materials of the instant invention. These prior art raw materials start boiling at about 405° C. at atmospheric pressure accompanied by decomposition. Chemically, the tar fractions used as raw materials by Fulton and Kunc and by Frolich are well known to consist preponderantly of highly condensed polycyclic substances, while the raw materials employed in the practice of our invention are preponderantly aliphatic or mono-cyclic aromatic or naphthenic substances. This difference is perhaps most strongly brought out by a comparison of the refractive indices which are of the order of 1.588 for the raw materials of the above mentioned patents, and of the order of 1.493 for the raw materials employed in the practice of our invention, indicating a profound difference in the chemical nature of the constituents of the materials.

The tar fractions, when treated in accordance with the preferred process of the instant invention, do not produce the drying lacquer-like resin solutions contemplated by the instant invention, but produce heavy, permanently soft or tacky materials of entirely different characteristics. The technical behavior of the Fulton and Kunc or Frolich tar fractions is different from that of the gasoline-like substances used in the practice of our invention, particularly as applied to the process of resinification, and the resins obtained from them are correspondingly different. Therefore, the applicability of a certain type of treatment to the tar fractions or materials of the prior art does not teach the applicability of a similar treatment to the chemically entirely different materials contemplated by our invention.

The process disclosed by Waterman in Patent No. 2,083,883 is dependent upon a reaction between a chlorinated hydrocarbon material and a non-chlorinated portion thereof, these materials comprising essentially a substantial amount of at least one member of the class consisting of unsaturated cyclic hydrocarbons and of naphthenes. In contradistinction, the preferred procedure of our invention consists of chlorinating the raw material to substantially a saturation point, and adding a condensation catalyst without admixing any non-chlorinated or partly chlorinated materials.

We have discovered that when the chlorination is carried to substantially a saturation point, the most satisfactory product is obtained. The process of the present invention produces a more highly polymerized product having a higher melting point than the product of the Waterman process, although identical raw materials may be employed. This has been confirmed by numerous experiments. When the Waterman process is applied to our preferred type of raw materials, a solution drying to a permanently soft or tacky film is obtained, while the present invention produces solutions drying to hard, tenacious films of far greater utility; for example, in the paint or lacquer industries.

If 50% or even 25% of a non-chlorinated material comprising essentially at least one member of the group consisting of unsaturated cyclic hydrocarbons and of naphthenes is added prior to the condensation step, as disclosed in the Waterman patent, the resulting product will not dry to a hard, tenacious film on exposure to the atmosphere, but will remain soft and tacky in contradistinction to the products obtained by the present invention. The same is true if the chlorination is interrupted prior to substantial saturation, in accordance with the alternative modification of the process disclosed by Waterman.

For some particular purposes we may advantageously add materials not chlorinated to saturation or non-chlorinated materials prior to the polymerization step. We may also have other resinous materials, or paint, or lacquer ingredients present during the polymerization step, or may add diluents or other inert or substantially inert materials to obtain a more advantageous viscosity for the operations, or otherwise more favorable operating conditions or results. A good baking lacquer is obtained by having present linseed oil during the polymerization step. However, such additions, while sometimes advantageous or desirable, do not form any essential part of our invention, and the invention does not contemplate the addition of any non-chlorinated or partly chlorinated material consisting essentially of a substantial amount of at least one member of the class consisting of unsaturated hydrocarbons and of naphthenes prior to the polymerization step, as disclosed by Waterman.

The patent to C. C. Towne, No. 2,084,927, contemplates the preparation of resins by condensing benzol with halides of normally gaseous olefines. The preferred raw materials of our invention do not contain any halides of normally gaseous olefines, nor are any such halides formed during the chlorination step of the process. This invention is thus clearly distinguished from the Towne disclosure.

Various aspects of our invention are illustrated in the following examples. As is apparent from the foregoing, the invention is capable of great variation, and is not limited to the particular raw materials, procedures and manipulative steps set forth in the examples.

*Example 1*

100 parts by weight of a fraction of a petroleum product prepared by catalytic condensation at 1150° C. to 1200° C. of gases formed by vapor phase cracking of petroleum, said fraction boiling between 40° and 200° C. at atmospheric pressure and having a specific gravity of 0.840 and a bromine number of 0.474 is chlorinated as long as the material avidly absorbs chlorine. During the chlorination it is necessary that the material be cooled, and the temperature is maintained between 20° and 60° C., preferably between 40° and 50° C. The chlorination is discontinued when the temperature begins to decrease spontaneously, indicating that those constituents which readily absorb chlorine have become substantially saturated. The specific gravity of the chlorinated material is of the order of about 1.1. The bromine number of the chlorinated material has been decreased to approximately 0.004, indicating that the material is a substantially saturated composition.

In this example, the chlorination is carried out by induction of gaseous chlorine, in darkness, in the absence of water and chlorination catalysts. No appreciable difference in the end product was observed, however, when the chlorination was carried out in light or in darkness, in the presence of or in the absence of water, or of a suspension of calcium carbonate in water or with an aqueous solution of calcium hypochlorite, or with liquid chlorine, or by other chlorination methods known to the art. When the chlorination was carried out under anhydrous conditions, the resulting product was at first darker in color than when water was present, but the product became lighter in color on continuation of the chlorination, so that the difference in the color of the end product was not appreciable. These experiences with different methods of chlorination indicate that wide variations in the procedure of chlorination may be employed without greatly affecting the yield or results of the process, or the character of the product.

However, when the chlorination was carried out in the presence of a catalyst tending to promote the introduction of chlorine into the aromatic nuclei, a group of catalysts which is well defined and enumerated in the advanced textbooks on preparative organic chemistry, the most commonly used catalyst of this class being aluminum chloride, iron, and iron plus iodine, a condensation will occur simultaneously with the chlorination, and a thick or heavy substantially non-drying product of high chlorine content is produced which is satisfactory, for example, as a wood impregnant.

To the chlorinated product is gradually intermixed, under agitation, 4% dry, finely divided aluminum chloride. When greater proportions of aluminum chloride are employed, the resulting product will have a lower chlorine content. For example, if 18% aluminum chloride is employed, the chlorine content of the solid resin constituent of the end product will be of the order of 7%, while in the present example, the chlorine content of the resin is about 13%. If lower proportions of the catalyst are employed, the resulting product will have a lower melting point and may be soft or even non-drying in character at ordinary temperatures. These solutions of low melting point resins obtained by polymerization with less than 4% aluminum chloride, or with condensation catalysts of lesser efficacy, such as ferric chloride, stannic chloride, zinc chloride, and the like, are particularly efficient as vermin resistant or repellent coating materials, possibly because of their high chlorine content.

From the foregoing, it is apparent that the amount of catalyst may be varied according to the properties which are desired in the final product. From 3% to 18% aluminum chloride may be advantageously employed and even lower or higher proportions to suit particular requirements, but usually we prefer to employ about 4% to 6% aluminum chloride, or equivalent proportions of other catalysts of similar action. Boron fluoride is a satisfactory catalyst for the purposes of our invention, the former tending to produce more brittle resins, and if employed in excess, totally insoluble black products.

During the addition of the catalyst, the temperature of the mass rises, and we therefore, prefer to add the catalyst gradually, in small portions, so that the temperature does not rise too rapidly, and preferably is maintained at about 50° C. If the reaction mixture is cooled too vigorously during this stage of the process, the reaction product will not have the property of drying to form a hard film, and the resinous product when isolated is much softer than when the product is prepared by allowing the reaction to proceed at the preferred temperature. However, there are instances where a softer product may be desired, and the reaction may then be carried out at lower temperatures, even as low as 0° C. or lower. Reaction at temperatures above the preferred range of from about 40° to 50° C. often result in the production of products which are darker in color, and somewhat lower yields are obtained. However, fairly good results have been obtained by carrying out the polymerization step while refluxing the composition at a temperature as high as about 110° C. The range of from about 20° C. to about 60° C. is, in general, a practical range for the polymerization, although deviations from this range may be desirable for particular purposes as indicated above. When employing raw materials having a low bromine number and/or low boiling range, higher polymerization temperatures and larger proportions of catalyst are generally preferred.

When the reaction subsides, the compound was maintained at a temperature of about 100° C. until cessation of the evolution of hydrogen chloride gas, which began on the addition of the catalyst. Usually the evolution of hydrogen chloride persists about 45 minutes. The hydrogen chloride may be recovered and the chlorine separated and employed in the chlorination of further quantities of the raw material. The reaction or polymerized product was cooled or allowed to cool. The product formed was a viscous, black, oily liquid containing the catalyst. When hydrogen fluoride is used as the condensation catalyst, the color of the product may be lighter.

To render the catalyst more readily removable, it is usually preferable to reduce the viscosity of the product by the addition of a suitable diluent or solvent. Particularly suitable for this purpose are hydrocarbon fractions containing unsaturated and/or aromatic constituents. In this particular example, we employed 35 parts by weight of the non-chlorinated fraction used as the raw material of the example. This material was here added merely as a diluent or solvent. No reaction occurred on the addition thereof as evidenced by the fact that no temperature change was observed, and no hydrogen chloride was evolved. Similar end products of the process were obtained when no added diluent or solvent was added before washing the product with water, or when other solvents, such as carbon tetrachloride or ethyl acetate were employed, and the sole purpose and function of the addition of these substances was to facilitate washing by reducing the viscosity.

It is preferable to add such amounts of the solvent or diluent so that the specific gravity of the resulting resin solution is different from that of the liquid used in washing out the catalyst to facilitate the separation of the different layers. Unless there is a sufficient difference in the specific gravities, separation is difficult.

The solution thus obtained was repeatedly washed with water, then mixed with calcium chloride or some other suitable dehydrating agent to remove the water, and the dehydrating agent then removed by filtration, decantation, or by centrifugal action. The yield was about 135 parts by weight of a dark brown resin solution containing approximately 60 parts by weight of a hard solid resin. This resin solution, when applied to a surface, hardened within 4 hours to form a hard, tenacious film of good adhesion to glass, concrete, gypsum, metals, and like surfaces, and was resistant to water, acids and alkalies. Upon admixture of pigments such as lithopone, iron oxide, aluminum powder, and the like, the drying time of the resin solution is greatly reduced, as disclosed and claimed in the copending application of Charley Gustafsson, Serial No. 197,201, filed March 21, 1938.

Example 2

100 parts by weight of a fraction of a polycondensate, prepared by catalytic condensation at 1150° to 1200° F. of the gaseous by-products from the operation of cracking gasoil in liquid phase under high pressure, boiling between 35° and 200° C. at atmospheric pressure and having a specific gravity of 0.784 and a bromine number of 0.924 were chlorinated as in Example 1. Six parts by weight of aluminum chloride were added, while agitating the mass. When the initial reaction subsided, the mixture was heated with steam at substantially atmospheric pressure for about 1½ hours. The resulting material was diluted with 40 parts by weight of ethyl acetate, washed with water, dried with calcium chlorida and centrifuged to remove these agents. The yield was 113 parts by weight of a dark brown liquid containing about 43% solid resin. This liquid, when exposed to the atmosphere in thin layers, dried to form a hard tenacious film of good adhesion to glass, metals, wood, and like surfaces.

Example 3

100 parts by weight of a hydrocarbon polycondensate prepared by catalytic condensation at 1050° to 1100° F. of the gaseous by-products from vapor phase cracking of petroleum were chlorinated, substantially to saturation, by induction of gaseous chlorine at a temperature between 40° and 50° C. This polycondensate raw material had a boiling range between 40° and 175° C. at atmospheric pressure, a specific gravity of 0.784, and a bromine number of 1.308. Upon completion of the chlorination, 12 parts by weight of aluminum chloride were added gradually while agitating the mass. The ensuing polymerization reaction was brought to completion by heating for about ½ hour with steam at substantially atmospheric pressure. 60 parts of benzol were added as a diluent. The composition was washed with water, dried with calcium chloride, and centrifuged to remove the drying agent. The yield was 180 parts by weight of a dark brown resin solution which, when applied to glass, wood, or the like surface, and exposed to the atmosphere, the liquid hardened to form a tenacious, very adherent film.

Example 4

100 parts by weight of the drying resin solution prepared according to Example 1 were distilled at atmospheric pressure until the volatile constituents had evaporated. The residue was dried at 200° C. under at 17 mm. vacuum. The product consisted of 44 parts by weight of an unsaponifiable dark colored resin which was soluble in solvents containing appreciable amounts of aromatic or unsaturated aliphatic hydrocarbons, in carbon tetrachloride, ethyl acetate, carbitol acetate, and the like. It is fully compatible with linseed oil, partly soluble in saturated hydrocarbons, and insoluble in water, lower aliphatic alwhich it is desired to remove.

Peculiarly, to obtain the greatest possible decolorization of the resin, it is essential to remove the very last traces of volatile constituents by prolonged heating in a vacuum prior to the extraction step. Even slight traces of these impurities greatly enhance the solubility in extraction solvents of those dark colored constituents which it is desired to remove.

The resin solutions prepared in accordance with Examples 2 and 3 also, on removal of the volatile constituents, produce solid resins of properties similar to those of the resins described in this example.

Example 5

300 parts by weight of a fraction of vapor phase cracked petroleum, boiling between 30° and 220° C. at atmospheric pressure and having a bromine number of 0.515 and a specific gravity of 0.868, were chlorinated in the absence of water by induction of gaseous chlorine. The temperature during the chlorination was maintained between 40° to 50° C. After about 70 minutes, the temperature began to decline, and the chlorine began to pass through the solution unabsorbed. The yield was 420 grams of a light brown, clear liquid, having a specific gravity of 1.103.

To 100 parts by weight of this chlorinated product was added 1 part by weight of anhydrous aluminum chloride, and the polymerization was allowed to proceed for 90 minutes at a temperature of 100° C. The resulting product, without dilution, was washed with water and dried with calcium chloride. The yield was 80 parts by weight of a dark brown oily liquid, which when applied to a surface in a thin layer and exposed to the atmosphere rapidly forms a non-drying, permanently tacky film. This liquid product contained about 40% of non-volatile resinous material.

This example is indicative of the results obtained when a very low percentage of catalyst is employed. With 4% catalyst instead of the 1% used in this example, the resin solution obtained will dry readily to a hard, tenacious film. The soft product obtained in this example has a higher chlorine content, and is satisfactory for use as a vermin repellent, as a moldicide in paints, or as a plasticizer.

Example 6

300 parts by weight of a petroleum product prepared by catalytic condensation at 1150° to 1200° F. of gases formed by vapor phase cracking of petroleum, said fraction boiling between 40° and 200° C. at atmospheric pressure and having a bromine number of 0.474 and a specific gravity of 0.840, was chlorinated by induction of gaseous chlorine at 45° to 50° C. substantially to saturation in the presence of 40 parts by weight of iron powder. Under these conditions, naturally some ferric chloride was formed and was present during chlorination. The latter part of the simultaneous chlorination and polymerization was carried out at a temperature of about 80° C. The product was washed with water to remove the catalyst, dried with calcium chloride, and centrifuged. The yield was 380 parts of a dark brown, viscous liquid, of faint odor, and specific gravity of 1.32. When applied to a surface and allowed to dry, it forms a permanently very tacky film of high chlorine content, and, therefore, possesses a high protective value against wood attacking organisms.

Example 7

100 parts by weight of a raw distillate obtained from high pressure liquid phase cracking of gas oil, boiling entirely below 300° C. at atmospheric pressure, and having a specific gravity of 0.735 and a bromine number of 0.492, were chlorinated as described in Example 1, the temperature during the chlorination being maintained between 20° and 50° C. The yield of chlorinated product was 162 grams of a liquid having a specific gravity of 1.136. Further processing carried out as described in Example 1 produced 133 parts of a lacquer-like liquid, which, however, dried more slowly than the product of Example 1, and on removal of the volatile constituents forms a softer resin.

Example 8

100 parts by weight of a fraction of a liquid obtained by polymerization of ethylene with phosphoric acid as a catalyst at 60 atmospheres pressure and 280° C., this fraction boiling between 40° and 300° C., and having a bromine number of 0.540, were subjected to the treatment described in detail in Example 1. The yield was 120 parts of a lacquer-like liquid, which on exposure to the atmosphere in a thin layer dried rapidly to form a hard, tenacious film of excellent adhesion to wood, glass, steel, and the like.

Further tests were carried out with narrower fractions of the raw materials mentioned above. These tests included experiments with fractions of each of the hydrocarbon products described in the above examples, these fractions boiling between 20° and 50° C., 50° and 60° C., 60° and 74° C., 92° and 128° C., 140° and 160° C., 150° and 160° C., 160° and 183° C., 140° and 260° C., 190° and 210° C., 210° and 240° C., and 240° and 300° C., and 280° and 300° C., at atmospheric pressure. The results of this experimental work proved that the process disclosed herein operates over this entire range of raw materials, and that the results are not greatly dependent upon the specific fraction selected, or on the narrowness of the fraction. Generally, fractions boiling above 140° C., produce more rapidly drying solutions, and harder resins than lower boiling fractions. As the boiling range of the fractions decreases unless higher boiling material is present, the degree of hardness of the resinous products also decreases, and if the boiling range is low, the product may be a non-drying oil, useful, for example, as a vermin repellent. That these widely different fractions of raw materials are satisfactory for the purposes of this invention illustrates that the reaction is of very general applicability, and that it is not dependent on any particular chemical entity or entities. The wide variation in chemical structure between the substances contained in the various fractions having different boiling ranges, is well known in the art, and is particularly apparent from the recent tabulations of products isolated from hydrocarbon fractions, for example, see Physical Constants of Principal Hydrocarbons by M. P. Doss; New York, 1939. However, from a practical commercial standpoint, we prefer to use fractions of a wide boiling range such as raw materials, a substantial part of which boils in the range of from 80° to 240° C. at atmospheric pressure and having a bromine number exceeding 0.400, or such raw materials which have a boiling range of from 20° to 300° C., and having a bromine number exceeding 0.314.

Petroleum products boiling higher than 400° C. show an entirely different behavior when an attempt is made to subject them to the method of the instant invention. Such high boiling petroleum tar fractions are composed principally of very highly condensed aromatic substances, in contra-distinction to the raw materials employed in the practice of our invention, which are gasoline-like materials, consisting preponderantly of aliphatic, or of monocyclic aromatic or naphthenic substances. The chemical characteristics and behaviors of these two classes of raw materials are obviously greatly different. If a tar fraction boiling above 400° C. at atmospheric pressure, such as the materials contemplated by Fulton and Kunc or by Frolich in Patents No. 2,038,558 and No. 2,052,172, is subjected to the preferred practice of our invention, as disclosed in Example 1, the product obtained is permanently non-drying, very dark, and, therefore, is of little utility as compared to the product obtained by the use of our raw materials. The character of the resins obtained from the tar fractions is chemically different, as is apparent and obvious from the highly polycyclic character of the raw materials. Products obtained by treatment in accordance with our invention of cracked petroleum fractions boiling between 300° and 400° C., show some similarity to the resins disclosed by Fulton and Kunc and by Frolich, as well as to the products of the instant application.

While the addition or use of any chemicals not previously discussed is unnecessary and non-essential to the success of the process, it is apparent and obvious that the addition of various substances at the different stages of the process may modify the ultimate product, and that at times such modifications may be desirable. Therefore, the present invention is not limited to the exact procedure of the examples, and the spirit and scope of our invention are not avoided by merely adding some inert material, or some material performing an obvious function prior to the chlorination step, or at any other stage of the process. It is fully apparent that for some purposes it may be convenient or desirable to add pigments, or fillers at some intermediate stage in the process, or to add some other lacquer or paint ingredients, or even to co-polymerize the product with some drying oils, or non-drying oils or fat derivatives, chlorinated or otherwise, for example to further enhance the water resistance of the product. All of these and like modifications are considered within the spirit and scope of this invention.

Our invention does not contemplate, however, and we expressly disclaim the addition prior to the polymerization step of a non-chlorinated or partially chlorinated hydrocarbon mixture comprising essentially a substantial amount of at least one member of the class consisting of unsaturated cyclic hydrocarbons and of naphthenes. The addition of such materials would cause a fundamental deviation in the resinification reaction, and would cause the formation of products disclosed by Waterman in Patent No. 2,083,883, which are distinct and entirely different from the resins and resinous materials contemplated by our invention.

The influence of various variables on the process and product is discussed in considerable detail in the description of Example 1. These comments are generally applicable.

With respect to the raw materials, the process is not limited to products obtained by any particular process. Apparently, fractions boiling below 300° C. at atmospheric pressure are representative materials which have been subjected to a pyrolytic treatment sufficient to induce changes or rearrangements in the molecules which might be attributed to interaction of free radicals. These materials are mixtures of various chemical entities, always containing a fair percentage of unsaturated aliphatic or aromatic substances or of naphthenes. The bromine number of the preferred raw materials exceeds 0.400, although a softer resin of fair properties was obtained from a fraction of liquid phase cracked gasoline having a bromine number of only 0.314, and although a useful impregnation compound was prepared from a fraction having a bromine number of as low as 0.090.

Obviously, the raw materials may be obtained by any process involving heating of hydrocarbon material to temperatures favorable to fortuitous combination of free radicals or by subjecting hydrocarbon materials to electrical discharges or like influences, regardless of whether the initial material is a highly complex mixture, such as, for example, a petroleum crude, or a gas oil, or whether it is a mixture of gaseous hydrocarbons such as liquid or vapor phase cracking gases, or natural gas, or a single chemical entity such as ethylene or acetylene. Even methane could be used as the initial material for producing fractions suitable for the purposes of our invention since methane is well known to form ethylene and hydrogen on pyrolysis, and ethylene is readily polymerized to yield fractions of satisfactory properties.

The raw material is not limited to products of petroleum origin, since similar products are obtainable, for example, by various processes involving hydrogenation of coal, and concurrent or subsequent pyrolytic treatment of the substances thus obtained.

Since it appears that there is no suitable generic term embracing the various substances which are satisfactory as raw materials for the purposes of our invention, and the obvious equivalents of such materials, we refer to these substances as "pyrogenic hydrocarbon materials" meaning thereby a mixed hydrocarbon material resulting from a treatment sufficient to cause an appreciable degree of those rearrangements or reactions which are known in the art as typical of pyrogenic reactions and which might be attributed to interaction of free radicals. These materials contain an appreciable amount of unsaturated aliphatic or aromatic or naphthenic hydrocarbons, as evidenced by a bromine number of at least 0.090, usually considerably higher. As typical examples of these materials which we term "pyrogenic hydrocarbon materials" may be mentioned the products resulting from all cracking treatments, including catalytic cracking procedures, such as the Houdry processes, from catalytic or non-catalytic high temperature polymerization of hydrocarbon gases, regardless of the origin of such gases and of the particular temperatures, pressures and catalysts employed, catalytically dehydrogenated hydrocarbon products, and products having a composition substantially similar to that of such substances, such similarity being expressed in an approximately similar (say within about 10%) boiling range, ratio between saturated and unsaturated, naphthenic and aromatic constituents, and consequent similar behaviors when subjected to the resinification treatments of this invention.

From the foregoing disclosure, it is apparent that the invention is capable of wide variations and modifications within wide limits depending upon the particular applications contemplated, and upon the properties desired in the final end product. The foregoing examples are not to be construed in any sense of limitation, but are given merely to illustrate the invention, which is to be limited only by the claims which follow, in which it is intended to claim all novelty inherent in this invention as broadly as possible in view of the prior art.

We claim:

1. A composition of matter comprising the product of the process consisting essentially of chlorinating, substantially to saturation, substantially unsaturated hydrocarbon material selected from the group consisting of cracked petroleum products, hydrocarbons obtained by polymerization of cracking gases, hydrocarbons obtained by polymerization of natural gases and hydrocarbons obtained by hydrogenation of coal, said hydrocarbon material having a boiling range below 300° C. at atmospheric pressure and polymerizing the chlorinated material by the use of a Friedel-Crafts type catalyst.

2. A composition of matter comprising the product of the process consisting essentially of chlorinating hydrocarbon material substantially to saturation, said hydrocarbon material being selected from the group consisting of cracked petroleum products, hydrocarbons obtained by polymerization of cracking gases, hydrocarbons obtained by polymerization of natural gases and hydrocarbons obtained by hydrogenation of coal, said hydrocarbon material having a bromine number exceeding .314 and being distillable below 300° C. at atmospheric pressure, polymerizing the chlorinated material by the use of a Friedel-Crafts type catalyst, removing the catalyst and removing the volatile constituents.

3. A composition of matter comprising the product of the process consisting essentially of chlorinating, substantially to saturation, a distillate of a cracked petroleum product, said distillate being substantially unsaturated and having a boiling range below 300° C. at atmospheric pressure, and polymerizing the chlorinated material by the use of a Friedel-Crafts type catalyst.

4. A composition of matter comprising the product of the process consisting essentially of chlorinating hydrocarbon material obtained by polymerization of cracking gas constituents, substantially to saturation, said hydrocarbon material being substantially unsaturated and having a boiling range below 300° C. at atmospheric pressure, and polymerizing the chlorinated material by the use of a Friedel-Crafts type catalyst.

5. A composition of matter comprising the product of the process consisting essentially of chlorinating hydrocarbon materially obtained by polymerization of natural gases, substantially to saturation, said hydrocarbon material having a bromine number exceeding .314, and a boiling range below 300° C. at atmospheric pressure, and polymerizing the chlorinated material by the use of a Friedel-Crafts type catalyst.

6. A composition of matter comprising the product of the process which essentially consists of chlorinating, substantially to saturation, hydrocarbon material containing a substantial proportion of unsaturated hydrocarbons, said material being selected from the group consisting of cracked petroleum products, hydrocarbons obtained by polymerization of cracking gases, hydrocarbons obtained by polymerization of natural gases, and hydrocarbons obtained by hydrogenation of coal, said hydrocarbon material having a boiling range below 300° C. at atmospheric pressure; the chlorination being carried out at a temperature between 20° and 60° C.; and polymerizing the chlorinated material by the use of a Friedel-Crafts type catalyst at a temperature between 20° and 60° C.

7. A composition of matter comprising the product of the process essentially consisting of chlorinating in the presence of a catalyst tending to promote the introduction of chlorine in aromatic nuclei, hydrocarbon material containing a substantial proportion of unsaturated hydrocarbons, said material being selected from the groups consisting of cracked petroleum products, hydrocarbons obtained by polymerization of cracking gases, hydrocarbons obtained by polymerization of natural gases, and hydrocarbons obtained by hydrogenation of coal, said hydrocarbon material having a boiling range below 300° C. at atmospheric pressure, and simultaneously polymerizing the chlorinated material.

8. A composition of matter comprising the product of the process consisting essentially of chlorinating hydrocarbon material substantially to saturation, said hydrocarbon material being selected from the group consisting of cracked petroleum products, hydrocarbons obtained by polymerization of cracking gases, hydrocarbons obtained by polymerization of natural gases, and hydrocarbons obtained by hydrogenation of coal, said hydrocarbon material having a bromine number exceeding .314 and being distillable below 300° C. at atmospheric pressure and polymerizing the chlorinated material by the use of aluminum chloride.

9. A lacquer-like resin solution obtained by the process which consists essentially of chlorinating, substantially to saturation, hydrocarbon material containing a substantial proportion of unsaturated hydrocarbons, said material being selected from the group consisting of cracked petroleum products, hydrocarbons obtained by polymerization of cracking gases, hydrocarbons obtained by polymerization of natural gases and hydrocarbons obtained by hydrogenation of coal, said hydrocarbon material having a boiling range below 300° C. at atmospheric pressure, and polymerizing the chlorinated material by the use of aluminum chloride.

10. A composition of matter comprising the product of the process which consists essentially of chlorinating, substantially to saturation, a vapor phase cracked hydrocarbon of petroleum origin, distillable below 300° C. at atmospheric pressure and having a bromine number exceeding .314, and polymerizing the chlorinated material by the use of a Friedel-Crafts type catalyst.

11. A composition of matter comprising the product of the process of chlorinating, substantially to saturation, a vapor phase cracked hydrocarbon material of petroleum origin, distillable below 300° C. at atmospheric pressure, and polymerizing the chlorinated material by the use of a Friedel-Crafts type catalyst without the addition of non-chlorinated or partly chlorinated materials prior to the polymerization step.

R. WALLER.
CHARLEY GUSTAFSSON.